May 13, 1924.

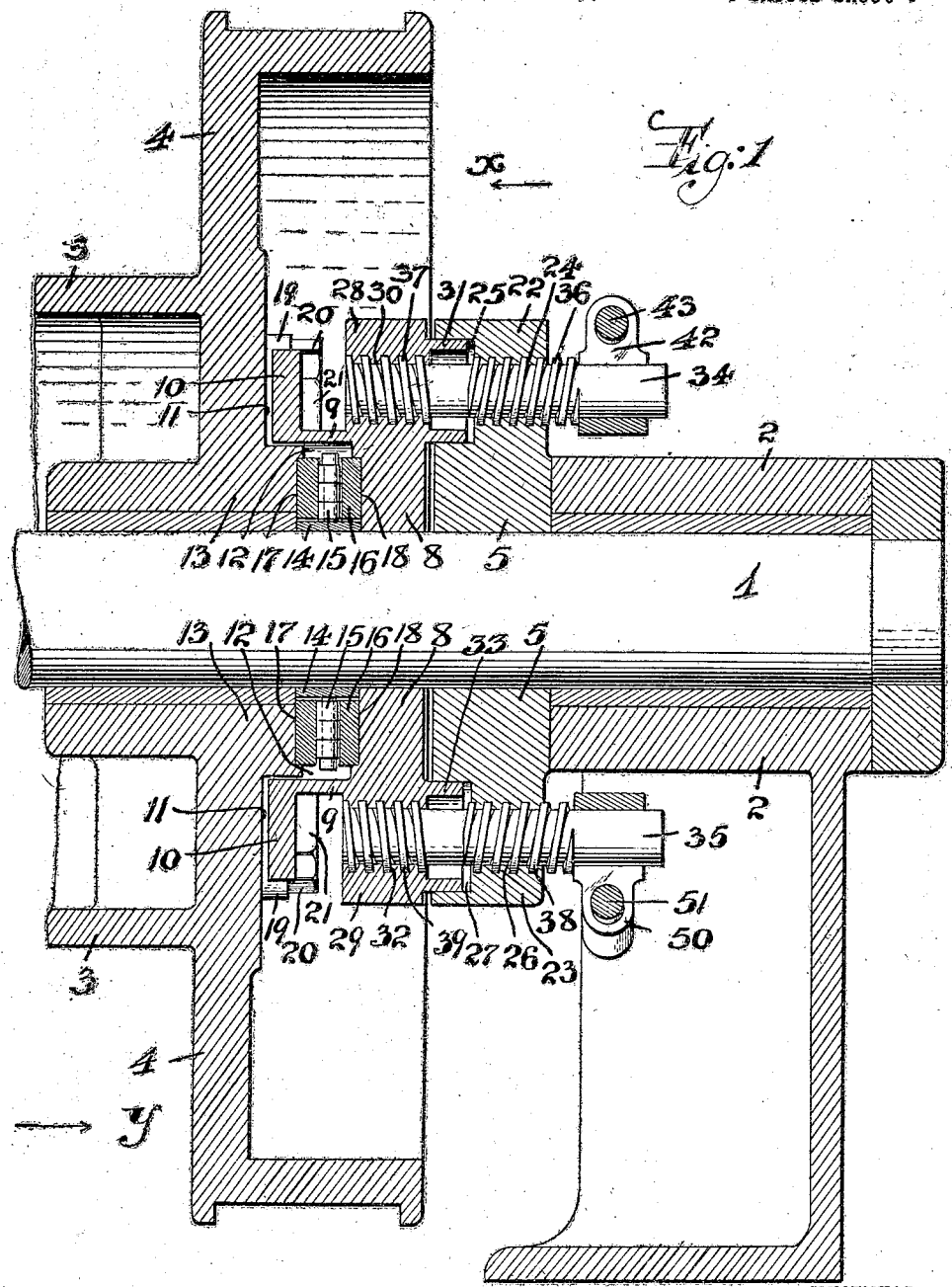

G. G. HAMILTON

THRUST DEVICE

Filed Oct. 7, 1920

INVENTOR:
George G. Hamilton,
BY
Fraentzel and Richards
ATTORNEYS.

May 13, 1924.
G. G. HAMILTON
1,494,166
THRUST DEVICE
Filed Oct. 7, 1920
4 Sheets-Sheet 3
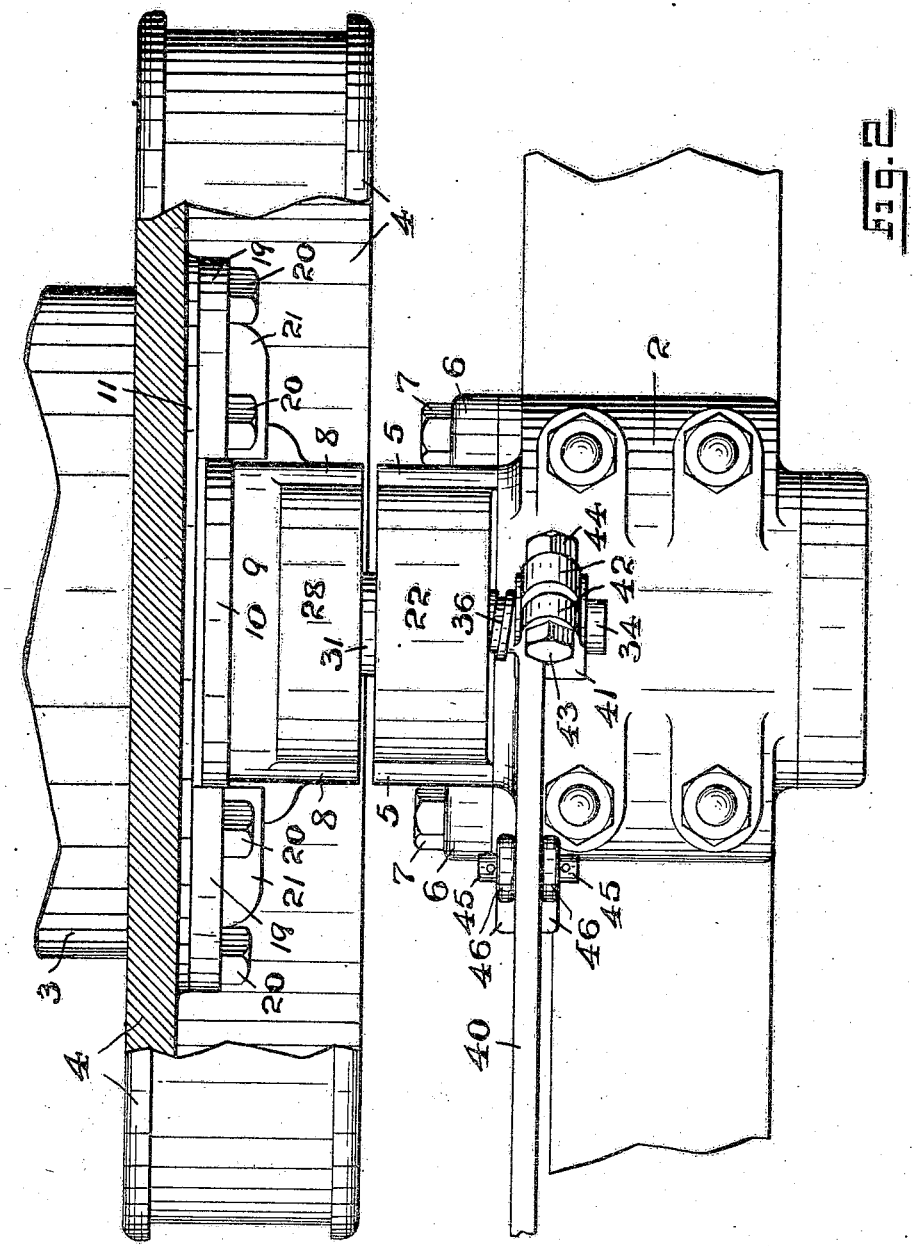
INVENTOR:
George G. Hamilton,
BY
Fraentzel and Richards
ATTORNEYS.

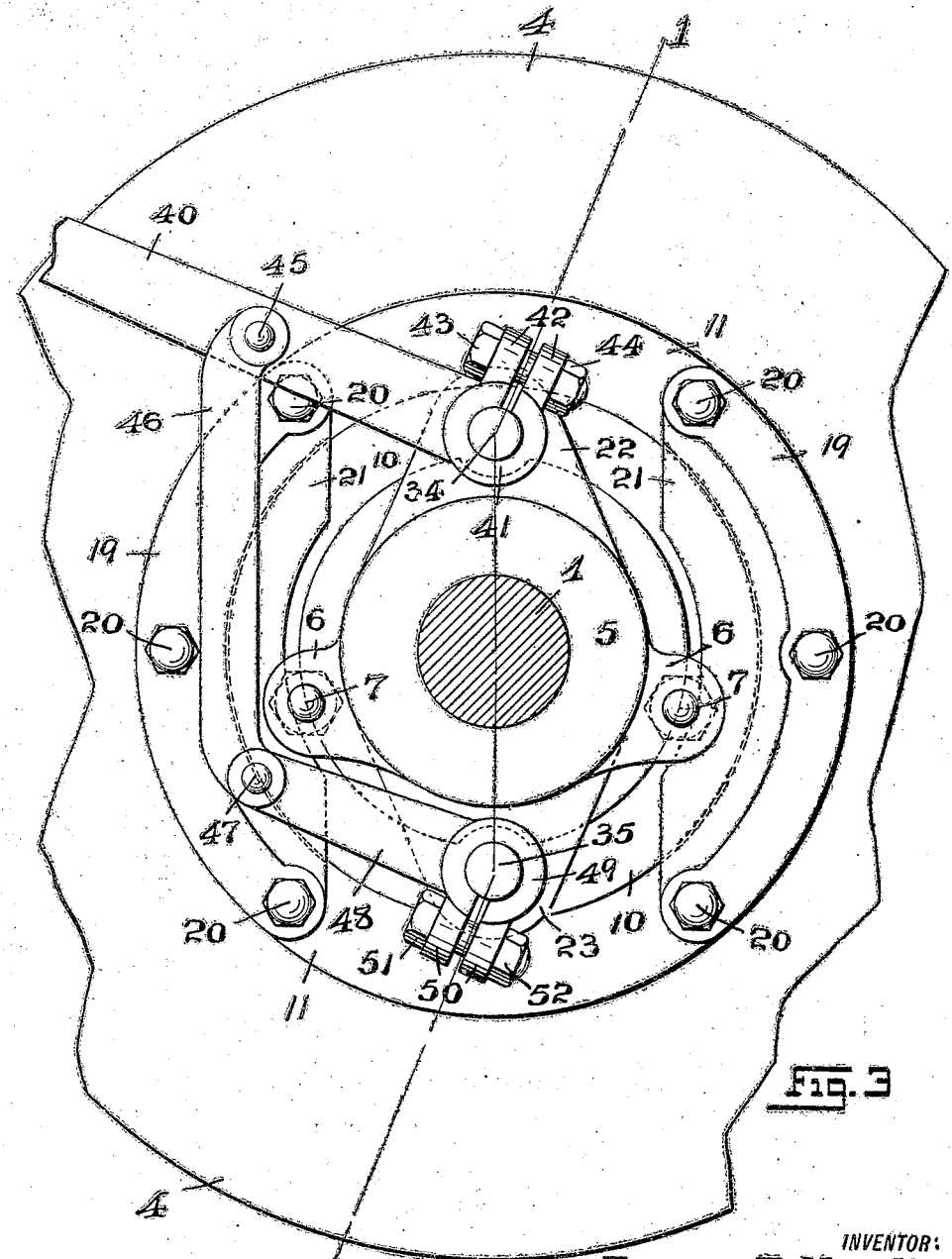

Patented May 13, 1924.

1,494,166

UNITED STATES PATENT OFFICE.

GEORGE G. HAMILTON, OF NEWARK, NEW JERSEY.

THRUST DEVICE.

Application filed October 7, 1920. Serial No. 415,345.

*To all whom it may concern:*

Be it known that I, GEORGE G. HAMILTON, a citizen of the United States, residing at Newark, in the county of Essex and State of New Jersey, have invented certain new and useful Improvements in Thrust Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in mechanical movements; and, the present invention has reference, more particularly, to a novel thrust mechanism, for use with machinery of the various kinds.

The present invention, therefore, has for its principal objects to provide a novel and simply constructed, as well as a quickly and efficiently operating thrust-mechanism, for use with machines of the various kinds, and which can be readily operated by means of a system of operating levers and links for producing the thrust-action of the mechanism that may be desired.

With the various objects of the present invention in view, the said invention consists, primarily, in the novel thrust device hereinafter more fully set forth; and, the said invention consists, furthermore, in the novel arrangements and combinations of the various devices and parts, as well as in the details of the construction of the said parts, all of which will be more fully described in the following specification, and then finally embodied in the clauses of the claims which are appended to and which form an essential part of the said specification.

The invention is illustrated in the accompanying drawings, in which Figure 1 is a vertical sectional representation taken on line 1—1 in Figure 3, of a thrust device, showing one embodiment of the principles of the present invention, and its application to the drum of a hoisting machine, with the actuating thrust-lever and links, being omitted from said view; and Figure 1ª is a horizontal sectional representation of the said device.

Figure 2 is a plan view of various devices and parts represented in said Figure 1, a certain portion of the hoisting drum being broken away and shown in horizontal sectional representation.

Figure 3 is an elevation of the thrust device with the shaft upon which it is mounted being represented in cross-section.

Similar characters of reference are employed in the said above described views, to indicate corresponding parts.

Figure 1A:
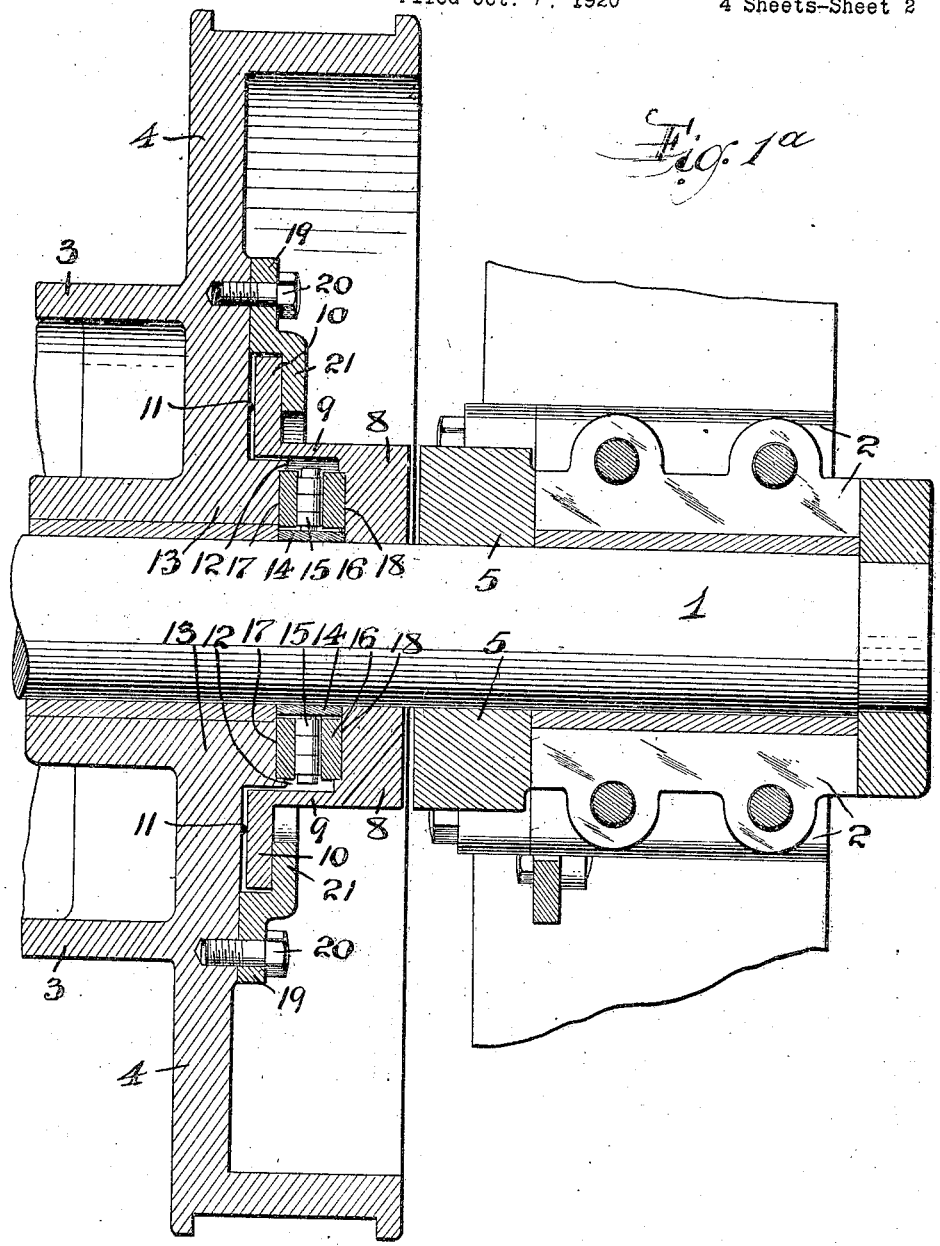

Referring now to the several figures of the drawings, the reference-character 1 indicates a main shaft or spindle, rotatably mounted in bearings, one of which is shown in Figures 1, 1ª and 2 of the drawings, and is generally indicated by the reference-character 2.

Operatively mounted upon the shaft or spindle 1 is an element 3, this element in the present case representing the drum of a hoisting machine, which is provided at its end-portion, as shown in the drawings, with the usual annular member 4.

Loosely mounted upon said shaft or spindle 1 is a thrust-member or element 5 which is provided with suitably disposed perforated marginal lugs or ears, as 6, for the reception of tap-bolts or screws 7, the screw-threaded shanks of which are adapted to be screwed into the side of the bearing 2, so as to maintain the said member 5 in a fixed position against turning with the shaft or spindle 1 when the same is being rotated. Also loosely mounted upon the shaft or spindle 1 is another thrust-member or element, as 8, said member being formed with an annular portion, as 9, which carries an outwardly extending marginal portion 10, usually located in close proximity to the flat surface-portion 11 of the annular member 4 of the drum 3, substantially as indicated in Figure 1 of the drawings. The said annular portion 9 of the member or element 8 provides a receiving chamber, as 12, into which the usual hub-portion 13 of the part 4 of the drum extends.

Suitably mounted upon said main shaft or spindle 1, in said receiving chamber 12, and between said hub-portion 13 and the said member or element 8, is a thrust-ring 14 having suitably disposed pins or studs 15 extending therefrom, and upon which pins or studs are rotatably disposed thrust-members or elements 16, usually in the form of rollers made of a resilient material, as rubber, said rollers being in rolling contact with the surface 17 of the hub-portion 13 and with the surface 18 of the member or element 8, in the manner illustrated in said Figure 1 of the drawings. The reference-character 19 indicates a pair of sector or arc-shaped guards, suitably secured to the surface-portion 11 of the part 4 of the drum 3 by means of tap-bolts 20, or any other suitable fastening means, said guards 19 having parts 21 which overlap portions of the outwardly extending marginal portion 10 of the member or element 8, in the manner substantially as illustrated in the several figures of the drawings, and the purposes of which will be self-evident from an inspection of said figures of the drawings.

As shown in said Figure 1 of the drawings, the previously-mentioned member or element 5 is made with extensions, as 22 and 23, the extension 22 having an internally screw-threaded part 24 and a receiving socket 25, and the extension 23 being likewise provided with an internally screw-threaded part 26 and a receiving socket 27. Similarly, the member or element 8 is also made with extensions, as 28 and 29, the extension 28 having an internally screw-threaded part 30 and a ring-shaped projection 31 which extends into and registers with the receiving socket 25. The extension 29 is likewise provided with an internally screw-threaded part 32 and a ring-shaped projection 33 which extends into and registers with the receiving socket 27. The reference-characters 34 and 35 indicate a pair of spindles, the spindles being respectively provided with right and left hand screw-threaded shank-portions 36 and 37, and 38 and 39, which are respectively disposed in the correspondingly screw-threaded portions 24 and 30, and 26 and 32, of the respective members or elements 5 and 8. It will be clearly evident, from an inspection of Figure 1, that rotary movements of the spindles 34 and 35, in one direction, when actuated, owing to the left hand screw-threads 37 and 39, will move the member or element 8, in the direction of the arrow $x$ in said Figure 1, causing its surface-portion 18 to bear more directly against the thrust-rollers 16, whereby any thrust or movement of the drum 3 in the direction of the arrow $y$ is quickly taken up, as it will be clearly evident. Rotating the spindles 34 and 35, in the opposite direction, will, of course, cause the outwardly extending marginal portion 10 of the member or element 8 to be moved against the flanges or parts 21 of the guards 19, whereby the drum 3 will move laterally upon the main shaft or spindle 1 in the direction of the arrow $y$.

One means of producing the above-mentioned rotary movements of the above-mentioned spindles 34 and 35 is shown more particularly in Figure 3 of the drawings, and the same consists, essentially, of a lever 40 provided with a split-eye 41 for mounting the same upon the free end of the spindle 34, said eye being provided with perforated lugs 42 and a bolt 43 and nut 44 for positively securing the said eye in its operative position upon the said end of the spindle 34. Pivotally connected with said lever 40, by means of a pin 45, is a link 46, said link in turn being also pivotally connected by means of a pin 47, with an arm 48 which is provided with a split-eye 49 for mounting the same upon the free end of the spindle 35, said eye being provided with perforated lugs 50 and a bolt 51 and nut 52 for positively securing said eye in its operative position upon the end of said spindle 35. Thus it will be seen, that by moving the lever 40 in a downward direction, the two spindles 34 and 35 will be simultaneously operated, so as to move the member or element 8 in the direction of the arrow $x$, the upward and return-movement of said lever 40, again simultaneously operating the spindles 34 and 35, so that the member or element 8 is moved in the direction of the arrow $y$. The control and degree of the movement of the lever 40 of course regulates the corresponding movements of the said member or element 8.

While in the foregoing description and in the drawings, I have described and illustrated the application of the thrust-device to the drum of a hoisting apparatus, it will be clearly understood that the principles of the present invention are applicable to machine-elements of the various kinds where it is desirable to take care of thrusts.

I am also fully aware, that changes may be made in the general arrangements and combinations of the various devices and parts, as well as in the details of the construction of the said parts, without departing from the scope of the present invention as set forth in the foregoing specification, and as defined in the clauses of the claims which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:—

1. In a thrust-device, in combination, with a shaft, a machine-element mounted upon said shaft, a thrust-ring also mounted upon said shaft, thrust-rollers mounted upon said ring, a pair of thrust-elements also mounted upon said shaft, but fixed against rotation with said shaft, ring-shaped projections upon one of said thrust-elements, the other thrust-element being provided with receiving sockets in alinement with said ring-shaped projections and with which said projections are in entered registration, said thrust-elements being also provided with extensions, the extensions of the respective thrust-elements being respectively provided with right and left-hand internally screw-threaded receiving portions, operating spindles connected with said thrust-elements having right and left-hand screw-threaded shank-portions working in the respective screw-threaded receiving portions of said thrust-elements, and means connected with said spindles for simultaneously actuating the same.

2. In a thrust-device, in combination, with a shaft, a machine-element mounted upon said shaft, a thrust-ring also mounted upon said shaft, thrust-rollers mounted upon said ring, a pair of thrust-elements also mounted upon said shaft, but fixed against rotation with said shaft, ring-shaped projections upon one of said thrust-elements, the other thrust-element being provided with receiving sockets in alinement with said ring-shaped projections and with which said projections are in entered registration, said thrust-elements being also provided with extensions, the extensions of the respective thrust-elements being respectively provided with right and left-hand internally screw-threaded receiving portions, operating spindles connected with said thrust-elements having right and left-hand screw-threaded shank-portions working in the respective screw-threaded receiving portions of said thrust-elements, and means connected with said spindles for simultaneously actuating the same, consisting of a main lever connected with one of said spindles, an arm connected with the other spindle, and a link pivotally connected at one end with said lever and at its other end with said arm.

3. In a thrust-device, in combination, with a shaft, a machine-element mounted upon said shaft, flanged guards mounted upon said machine-element, a thrust-ring also mounted upon said shaft, thrust-rollers mounted upon said ring, a pair of thrust-elements also mounted upon said shaft, but fixed against rotation with said shaft, one of said thrust-elements being provided with an outwardly extending marginal portion in entered relation with the flanges of said guards, ring-shaped projections upon one of said thrust-elements, the other thrust-element being provided with receiving sockets in alinement with said ring-shaped projections and with which said projections are in entered registration, said thrust-elements being also provided with extensions, the extensions of the respective thrust-elements being respectively provided with right and left-hand internally screw-threaded receiving portions, operating spindles connected with said thrust-elements having right and left-hand screw-threaded shank-portions working in the respective screw-threaded receiving portions of said thrust-elements, and means connected with said spindles for simultaneously actuating the same.

4. In a thrust-device, in combination, with a shaft, a machine-element mounted upon said shaft, flanged guards mounted upon said machine-element, a thrust-ring also mounted upon said shaft, thrust-rollers mounted upon said ring, a pair of thrust-elements also mounted upon said shaft, but fixed against rotation with said shaft, one of said thrust-elements being provided with an outwardly extending marginal portion in entered relation with the flanges of said guards, ring-shaped projections upon one of said thrust-elements, the other thrust-element being provided with receiving sockets in alinement with said ring-shaped projections and with which said projections are in entered registration, said thrust-elements being also provided with extensions, the extensions of the respective thrust-elements being respectively provided with right and left-hand internally screw-threaded receiving portions, operating spindles connected with said thrust-elements having right and left-hand screw-threaded shank-portions working in the respective screw-threaded receiving portions of said thrust-elements, and means connected with said spindles for simultaneously actuating the same, consisting of a main lever connected with one of said spindles, an arm connected with the other spindle, and a link pivotally connected at one end with said lever and at its other end with said arm.

In testimony, that I claim the invention set forth above I have hereunto set my hand this 1st day of October, 1920.

GEORGE G. HAMILTON.

Witnesses:
Fred'k C. Fraentzel,
Eva E. Desch.